Patented Dec. 18, 1928.

1,696,152

UNITED STATES PATENT OFFICE.

ARTHUR W. SWANBERG, OF YOUNGSTOWN, OHIO, ASSIGNOR OF ONE-HALF TO B. P. HIGBY, OF YOUNGSTOWN, OHIO.

LUBRICATING MIXTURE.

No Drawing. Application filed August 16, 1926. Serial No. 129,661.

This invention relates to improvements in a lubricant or working compound for shock absorbers of the piston type.

An object of this invention is to produce a lubricating compound which has a relatively high viscosity at both low and high temperatures, and which will retain its high viscosity for indefinite periods of time under heavy loads and independent of the temperature attained.

By using a lubricating oil having a relatively high viscosity and which is not easily affected by changes in temperature, and by mixing therewith a suitable finely divided solid material which does not injuriously react with the oil or with the material of the cylinder or piston and which also forms with the oil a stable suspension, it is possible to increase the viscosity very substantially of the lubricating mixture and thus make a lubricating mixture suitable for use in shock absorbers or other cushioning mechanism. Such a mixture is very desirable for use in connection with shock absorbers of the piston and cylinder type in that a high viscosity will be maintained even when the mixture is subjected to high operating temperatures such as above the boiling point of water and if the finely divided solid material be selected so that it forms a stable suspension and does not cause excessive wear of the piston and cylinder a very desirable lubricating mixture for use in shock absorbers is thus obtained. Such a mixture is particularly advantageous for completely filling the cylinders of shock absorbers having a cylinder and piston rod which may be respectively secured to the frame and spring or axle of an automobile to act as a cushioning device. In such a shock absorber the piston rod is provided with the usual piston head and apertures are provided in the head to permit the lubricating mixture to pass from one side of the head to the other upon relative longitudinal movement of the piston and cylinder. It is also obvious that a shock absorber having such a lubricating mixture may be used in connection with other mechanism where it is desired to cushion relative movement of the parts.

It is also to be understood that such a shock absorber as mentioned above when completely filled with the lubricating mixture disclosed herein will serve not only to prevent undue rebound of the spring mechanism of an automotive vehicle but will also act to cushion all minor relative movements between the frame and springs thus serving both as a shock absorber and snubber as these terms are commonly used in the trade.

A mixture of castor oil and plaster of Paris will form a stable suspension, and this lubricating mixture will retain its high viscosity without separation of the plaster of Paris from the oil during long continued usage in the cylinder of a shock absorber and under all operating conditions of a motor vehicle in cold and hot weather.

The amount of plaster of Paris to be added to the castor oil may be varied, depending upon the viscosity desired and the loads to which the compound is to be subjected. For use in cushioning light automobiles, such as Fords, a mixture of 20% to 25% by weight of finely divided plaster of Paris with castor oil gives very good results and can be run relatively long periods of time, such as a year or two, without changing and without substantial loss or change of viscosity or separation of the plaster of Paris from the oil. This mixture forms a very stable suspension which remains so under all normal operating conditions.

It is to be understood, however, that other materials may be used in connection with the castor oil, such as whiting, Portland cement, etc. Such materials, however, should be sufficiently soft so that they will not cut the piston and cylinder rapidly and the wear is, therefore, reduced to a minimum. For this reason I prefer plaster of Paris for it has been found in actual service that there is very little wear on the parts, but it is to be understood that any materials forming a stable suspension with castor oil and which do not cause excessive wear of the parts may be used.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

What I claim is:

1. A viscous mixture for shock absorbers of the fluid type or similar devices, said mixture comprising a viscous stable suspension of castor oil, and finely divided plaster of Paris in amount approximating twenty-five percent by weight of the castor oil.

2. A viscous mixture for shock absorbers of the fluid type or similar devices, including a relatively stable suspension of castor oil and finely divided plaster of Paris, said plaster of Paris being present in amount sufficient to provide a mixture of relatively high viscosity.

In testimony whereof I affix my signature.

ARTHUR W. SWANBERG.